(12) United States Patent
Tremblay et al.

(10) Patent No.: US 8,397,708 B2
(45) Date of Patent: Mar. 19, 2013

(54) COMPOSITIONS AND PROCESSES FOR ASSEMBLING APPLIANCES

(75) Inventors: Scott R. Tremblay, Newington, CT (US); Michael P. Levandoski, Bristol, CT (US); Sean P. McGrath, Wethersfield, CT (US)

(73) Assignee: Henkel Corporation, Rocky Hill, CT (US)

( * ) Notice: Subject to any disclaimer, the term of this patent is extended or adjusted under 35 U.S.C. 154(b) by 1576 days.

(21) Appl. No.: 11/909,163

(22) PCT Filed: Mar. 24, 2006

(86) PCT No.: PCT/US2006/010549
§ 371 (c)(1),
(2), (4) Date: Sep. 20, 2007

(87) PCT Pub. No.: WO2006/104825
PCT Pub. Date: Oct. 5, 2006

(65) Prior Publication Data
US 2010/0252019 A1 Oct. 7, 2010

Related U.S. Application Data

(60) Provisional application No. 60/665,228, filed on Mar. 25, 2005.

(51) Int. Cl.
*F24C 15/10* (2006.01)
(52) U.S. Cl. .......... 126/211; 126/214 A; 126/39 H; 126/214 B; 219/462.1; 219/460.1; 219/452.11; 52/396.1; 156/276

(58) Field of Classification Search .......... 126/211, 126/214 A, 39 H, 214 B; 219/462.1, 460.1, 219/452.11; 52/396.1; 156/276
See application file for complete search history.

(56) References Cited

U.S. PATENT DOCUMENTS

| | | | | |
|---|---|---|---|---|
| 4,320,164 A | * | 3/1982 | Nicolas et al. | 428/167 |
| 4,459,506 A | * | 7/1984 | Beck | 313/315 |
| 4,477,326 A | | 10/1984 | Lin | 522/21 |
| 4,504,629 A | | 3/1985 | Lien et al. | 525/288 |
| 4,528,081 A | | 7/1985 | Lien et al. | 522/39 |
| 4,587,276 A | | 5/1986 | Lien et al. | 522/34 |
| 4,675,346 A | | 6/1987 | Lin et al. | 522/39 |
| 4,699,802 A | | 10/1987 | Nakos et al. | 427/515 |
| 4,973,826 A | | 11/1990 | Baudry et al. | 219/466.1 |
| 5,036,831 A | | 8/1991 | Ray | 126/211 |
| 5,571,434 A | | 11/1996 | Cavener et al. | 219/464 |
| 5,696,209 A | * | 12/1997 | King et al. | 525/478 |
| 5,768,979 A | * | 6/1998 | Antoine | 219/622 |
| 6,043,462 A | * | 3/2000 | Stedron et al. | 219/452.11 |
| 6,050,176 A | | 4/2000 | Schultheis et al. | 99/339 |
| 6,111,229 A | | 8/2000 | Schultheis | 219/452.11 |
| 6,207,934 B1 | | 3/2001 | Steiner et al. | 219/452.11 |
| 6,313,447 B1 | * | 11/2001 | Steiner et al. | 219/462.1 |
| 6,410,891 B1 | | 6/2002 | Muskalla et al. | 219/452.11 |
| 6,584,744 B1 | * | 7/2003 | Schultheis et al. | 52/396.1 |
| 6,613,185 B1 | * | 9/2003 | Valade et al. | 156/329 |
| 6,621,616 B1 | * | 9/2003 | Bauer et al. | 359/273 |
| 2003/0074963 A1 | * | 4/2003 | Uramachi | 73/204.22 |
| 2006/0181667 A1 | * | 8/2006 | Doi et al. | 349/155 |
| 2007/0221227 A1 | * | 9/2007 | Ho | 128/206.24 |

* cited by examiner

*Primary Examiner* — Avinash Savani
(74) *Attorney, Agent, or Firm* — Steven C. Bauman

(57) ABSTRACT

A method of assembling an appliance using a curable silicone composition optionally containing spacer beads of an appropriate size to permit adhesively joining the appliance parts in a desirably spaced-apart arrangement.

26 Claims, 1 Drawing Sheet

COMPOSITIONS AND PROCESSES FOR ASSEMBLING APPLIANCES

CROSS REFERENCE TO RELATED APPLICATIONS

This application claims the benefit on an earlier filing date from International Patent Application No. PCT/US2006/010549, filed Mar. 24, 2006, which claims the benefit of an earlier filing date from U.S. Provisional Application No. 60/665,228, filed Mar. 25, 2005.

FIELD OF THE INVENTION

This invention relates to the use of rapid curing silicone compositions optionally containing spacer beads in the assembly of appliance parts. In particular, this invention relates to the use of such compositions for assembling glass cooktops to range mainframes.

BRIEF DESCRIPTION OF RELATED TECHNOLOGY

The use of adhesives in the assembly and manufacture of appliances has become more prevalent and in many instances has replaced traditional fastener and/or weld applications. The term appliances is generally meant to include, without limitation, those items such as cooktops, ranges and ovens, dishwashers, microwave ovens, washing machines and dryers, among others.

Currently, curable silicone compositions have been used in certain applications, such as the bonding of cooktops to range mainframes. In such applications, the cooktop is generally of a different type of material than the range mainframe. For example; glass cooktops are currently bonded to the metal range mainframe using curable silicones, but in order to properly attach the cooktop, a double-sided foam tape, or other such spacer elements is used as a spacer to ensure adequate spacing between the glass cooktop and the metallic base below. This method of assembly is labor intensive and costly to the manufacturer, primarily because the tape has to be manually placed around the perimeter of the mainframe prior to the dispensing of the silicone composition. The tape is used solely as a spacer that would enable the assemblers to rework a cooktop and provides no bonding or sealing value to the application. Additionally, the double-sided foam tape can interrupt the continuous line of silicone which may be required in order to bond the assembly together.

In addition, the known curable silicone compositions presently used require a pre-conditioning step prior to mating the glass cook top to the range mainframe, so that the curable silicone composition will develop sufficient adhesive strength prior to mating to allow the joint to form. Moreover, during certain parts of the calendar year, the pre-conditioning step may also include exposure to higher than normal relative humidity conditions to allow that adhesive strength to develop. Such preconditioning adds costs to the process and decreases throughput.

It would be advantageous to provide a method of assembling appliances using curable silicone compositions, as well as the resultant assembled appliance made therefrom, which eliminates the need for the adhesive spacer tape or other such separate spacing elements which must be individually applied in addition to the silicone composition in order to obtain the proper distance of the two assembled parts.

SUMMARY OF THE INVENTION

Figure 1:
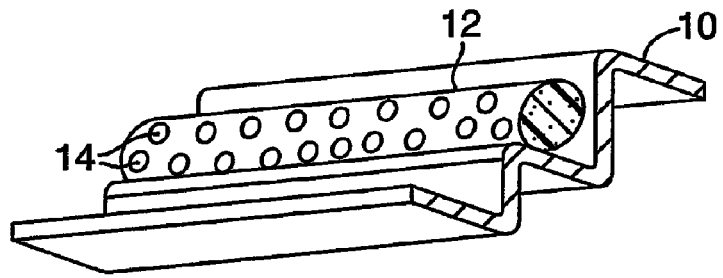
FIG. 1 shows a perspective view of a metal substrate of an appliance assembly, having a line of curable silicone composition deposited thereon. The composition optionally contains spacer beads.

The present invention provides a means of joining appliance assemblies using curable silicone compositions. The present invention provides an assembly method which incorporates spacer beads into the silicone composition which eliminates several process steps and is more cost effective in the manufacturing process than currently assembly methods.

In one aspect of the present invention, there is provided a method of assembling an appliance which includes the steps of providing a first substrate, each having interior surfaces to be bonded together; depositing a curable silicone composition including a silicone resin and spacer beads on at least one of the interior surfaces of the substrates; positioning the interior surfaces in mating arrangement to permit the curable silicone composition to maintain a desired space between the substrates; and permitting the curable silicone composition to cure.

In another aspect of the present invention, there is provided an appliance assembly which includes for instance a metal cooking range frame; and a glass cooktop bonded to said frame, where the cooktop is bonded in a defined spaced apart arrangement by a cured silicone composition containing spacer beads.

DETAILED DESCRIPTION OF THE INVENTION

The silicone compositions useful in the present invention can be chosen from a wide variety of one-part and two-part compositions. Desirably, the compositions are rapid curing, to provide advantages in the assembly process relating to handling and cost savings in manufacturing time. Another desirable aspect of useful silicone compositions include the ability to withstand a wide range of temperatures, particularly high temperatures in application involving extreme heat, such as in cooktop/range frame assemblies.

In one aspect of the invention, it is desirable that the silicone composition be one that is room temperature vulcanizable ("RTV"). These compositions may also be one or two-part compositions, and desirably cure by exposure to ambient moisture. RTV compositions may be based on acetoxy-containing compositions, oxime-containing compositions, methoxy-containing compositions, or other known moisture-cure groups. Combinations of these moisture-curing groups may also be present. Additionally, vinyl-containing silicone compositions and methacryl-containing silicone resins may be employed.

In another aspect of the invention, the curable silicone composition may be one which has both moisture cure capability as well as radiation cure capability. For example, compositions which cure by UV or visible light in addition to moisture cure mechanisms are also useful. An example of such silicone compositions may be found in U.S. Pat. Nos. 4,528,081, 4,504,629, 4,587,276, 4,477,326, 4,675,346 and 4,699,802, which are incorporated herein by reference in their entirety. Heat curing silicone compositions may also be employed in the present invention, and may be especially suitable for certain applications.

Useful silicone compositions include those commercially available and sold by Henkel Corporation under the tradename of NUVASIL.

FIG. 1 shows a substrate 10 of an appliance assembly having a line of adhesive 12 disposed on the interior surface of substrate 10, which is included to matingly engage with another substrate surface of the appliance assembly. In this embodiment, silicone composition 12 shows spacer beads 14 in the silicone composition. This figure represents a perspective view of the deposition of the curable silicone composition on an appliance substrate surface. Substrate 10 is desirably metal, but may be ceramic, glass-ceramic or plastic material.

Figure 2:
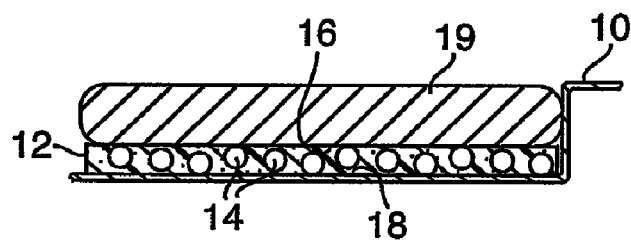
FIG. 2 shows a view of two substrates of an appliance assembly, one of which being constructed of metal and the other which may be glass or glass/ceramic sealingly connected in a spaced apart arrangement having curable silicone therebetween. The silicone contains spacer beads.

FIG. 2 shows a substrate surface 18 of the substrate 10 bonded to a second substrate surface 16 of a second substrate 19 by means of curable silicone composition 12 containing spacer beads 14 therewithin. This assembly shows the silicone composition 12 containing the spacer beads 14 bonding the two substrate surfaces 16, 18 together while maintaining a spaced apart arrangement due to the presence of the spacer beads.

The general configurations shown in FIGS. 1 and 2 are applicable to a variety of different appliance assemblies. For example, such assembly units may be found in appliances such as cooktop/range mainframe assemblies, dishwasher assemblies, washer assemblies, dryer assemblies, and other such appliances where the bonding of two substrates in spaced apart arrangements are required.

Figure 3:
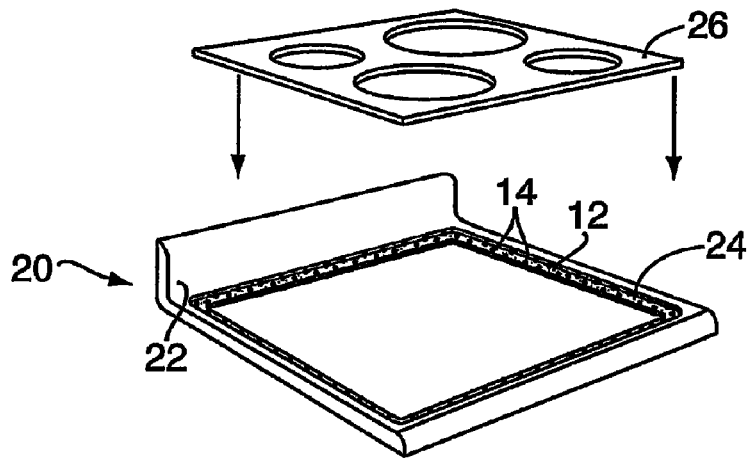
FIG. 3 shows a cooktop/range frame assembly which incorporates the use of the curable silicone containing spacer beads to sealingly attach the assembly units in a spaced apart arrangement.

Turning to FIG. 3, this embodiment depicts one particular useful application for the present assembly method. FIG. 3 shows a cooktop/range frame assembly 20. The assembly includes a metal mainframe or base substrate structure 22 which includes a lip 24 upon which the cooktop 26 rests and is bonded thereto by means of adhesive 12, which includes spacer beads 14. Cooktop 26 may be made from a wide variety of known materials, including glass, ceramics, glass ceramic composites as well as other well known materials. For a partial list of useful materials, see U.S. Pat. Nos. 4,973,826, 6,050,176, 6,111,229 and 6,410,891.

One particularly desirable embodiment of the present invention involves substrate surfaces which differ in compositional makeup. For example, one substrate may be made from a glass or glass-ceramic composite material which is capable of conducting heat, such as in a stove cooktop application. The second substrate is desirably a metal or metal coated substrate, such as for example, those found as frames for ovens and cooking ranges. The bonding of these two dissimilar materials, i.e., the glass/ceramic cooktops with the metal range frame, may require an adhesive that can provide bonding, sealing, shock-resistance and high temperature performance. Curable silicone compositions which are capable of providing such advantages are useful in the current invention. In this particular embodiment, as in many other appliance assemblies, adequate spacing between the joined substrates is desirable. That is, prior to curing the flowable silicone composition must maintain a desired spacing between the substrates. Since conventional flowable (uncured) silicone compositions do not have sufficient structural integrity to resist the weight of the substrate without flowing, conventional spacers such as foam tapes have been used alongside the silicone to prevent the weight of the substrate from compressing, flattening, or otherwise compacting the silicone composition and diminishing the space in between the substrates to a commercially unsatisfactory level. In the present invention, the incorporation of spacer beads within the curable silicone composition provide a means whereby the silicone composition resists compression and maintain the desired spacing between substrates. In some embodiments, the size of the glass beads per se may define the minimum spacing between the substrates. In other embodiments, the presence of spacer beads may result in a change in the rheological nature of the silicone such that it can withstand higher compressive forces in the uncured state. That is, once deposited onto the substrate, the weight of the joining substrate is resisted by the uncured silicone composition and the desired spacing between the substrates results due to the presence of spacer beads. Proper spacing in addition to enabling the assembler to rework wrongly aligned assemblies prevents the uncured silicone composition from being forced out of the intended bonding area or bond joint and results in a stronger adhesive joint, improved sealability and shock resistance.

The spacer beads that may be incorporated into the curable silicone composition may be made from a wide variety of materials, may be solid or hollow, and may take on various sizes and shapes. In particular, glass and plastic beads are among those that have been useful. Combinations of different size beads may be employed, as well as combinations of materials, such as glass, plastic and elastomers. The spacer beads may be hollow or solid. Bead size may vary, but is desirably within the range of about 0.005 to about 0.05 inches in average diameter. Generally, spherical shaped beads are desired, which are intended to include elliptical and oval shapes. The beads may be present in the composition in amounts of about 0.05% to about 10.0% by weight, desirably about 1.0% to about 6.0% by weight and more desirably about 2.0% to about 4.0% by weight. The percent weight of the beads may be calculated for a two-part silicone based on the individual part in which the beads are incorporated, and for a one-part based on the weight of the total composition.

EXAMPLES

Composition I in Table 1 below is representative of an inventive one-component silicone adhesive using spacer beads to provide a set tolerance for bonding together two appliance components. The formulation example is a one-part acetoxy-containing RTV silicone, As mentioned above, other one-part silicone compositions based upon different chemistries, i.e., moisture curing (condensation), light cure (free radical polymerization), light cure/moisture dual cure, or heat (hydrosilyation) cure mechanisms are also included as part of this invention.

Useful one-part RTV compositions may include, for example, hydroxy terminated poly dimethyl siloxane (PDMS), carbon black (or other fillers) and fumed silica. These compositions may be used to form a uniform base using mechanical mixing. Sufficient crosslinkers that terminate the hydroxy sites of the polymer and act as additional crosslinkers and moisture scavengers to remove any water present, may then be incorporated, i.e., acetoxy-, alkoxy-, oxime-containing silanes. Condensation catalyst may then be added. In addition, other conventional performance or rheology modifiers can be added as needed to meet desired properties. An example of a one-part RTV composition used in the invention is shown below in Table 1.

TABLE 1

Composition I; One-Part RTV Silicone

| Chemical | Weight % |
|---|---|
| Hydroxy Terminated Poly DiMethyl Siloxane (PDMS) Polymer | 72.3 |
| Methyl Terminated PDMS Polymer | 10.0 |
| Carbon Black | 0.5 |
| Fumed Silica | 12.0 |
| Ethyl tri-acetoxysilane | 2.5 |
| Methyl tri-acetoxysilane | 2.5 |
| Condensation Catalyst (tin) | 0.2 |

To Composition I, four different diameter thickness spacer beads were incorporated therein at the weight percents shown in Table 2. A line of adhesive material was then applied to one substrate and then assembled to a second substrate and allowed to cure. The thickness of the gap was then measured across different locations in the assembly as reported in Table 2. As shown in the Table, the spacing at each of five (5) different points along the applied line of adhesive was virtually consistent, indicting the ability of the compositions to maintain uniform spacing between the substrates. The assembly was a mock-up version of appliance parts.

TABLE 2

Spacer Bead Composition Examples and Measured thicknesses

Weight % of Composition I to Spacer Beads

| Composition | A | B | C | D | E |
|---|---|---|---|---|---|
| Formulation I | 99.5 | 99.0 | 98.0 | 96.0 | 99.0 |
| Spacer Beads | 0.5 | 1.0 | 2.0 | 4.0 | 1.0 |
| (Diameter) | (0.0098 in.) | (0.0234 in.) | (0.0331 in.) | (0.040 in.) | (0.040 in.) |

Applied 0.25 inch diameter continuous line of composition to one substrate and then assembled Measured Adhesive Thickness

| Point 1 | 0.010 | 0.025 | 0.035 | 0.042 | 0.042 |
|---|---|---|---|---|---|
| Point 2 | 0.010 | 0.025 | 0.036 | 0.042 | 0.042 |
| Point 3 | 0.010 | 0.025 | 0.035 | 0.043 | 0.042 |
| Point 4 | 0.010 | 0.025 | 0.035 | 0.043 | 0.043 |
| Point 5 | 0.010 | 0.025 | 0.036 | 0.042 | 0.042 |

It is also desirable to incorporate the spacer beads into two-part silicone adhesives. Two-part condensation curing silicone adhesives generally have faster cure speeds then one-part RTV silicone adhesives and may be preferred in applications when the one-part light cure, light cure/moisture or heat cure adhesives can not be used. Two-part hydrosilyation silicone adhesives offer lower or room temperature fast cures versus their one-part equivalents.

An example of the two-part condensation cure composition may include a wet (water-containing) component (Part A) and a dry (non-water containing) component (Part B) that are stable as liquids by themselves but when mixed form a solid silicone rubber with variable cure speeds and performance properties. The spacer beads may be incorporated into either or both parts as shown in Table 3. The cure speed (open time) of the compositions may be adjusted from about 15 minutes to several hours since atmospheric moisture is not necessary for cure, i.e., the water required for cure is already present in the formulas. The properties of the cured material may also be adjusted to achieve desired performance, flow characteristic and adhesion characteristics.

One useful two-part condensation cure composition may include hydroxy terminated poly dimethyl siloxane (PDMS), filler and water to make the wet (Part A) component. The dry (Part B) component may include methyl terminated PDMS, dried filler, crosslinker, adhesion promoter and condensation catalyst. One example is shown below in Table 3 of a composition useful for this invention. Other two-part silicone compositions having different components may also be used.

TABLE 3

Composition II; Two-Part RTV Silicone

| Component | Weight % Composition | | |
|---|---|---|---|
| | F | G | H |
| Volume Mix Ratio, Part A to Part B | 2:1 | 2:1 | 2:1 |
| Part A | | | |
| Hydroxy Terminated PDMS Polymer | 59.5 | 63.5 | 61.5 |
| Calcium Carbonate (other include silicates, oxides, alumina's and silica's and combinations of) | 36.0 | 36.0 | 36.0 |
| Water | 0.5 | 0.5 | 0.5 |
| 0.040 inches Spacer Beads | 4.0 | — | 2.0 |
| Part B | | | |
| Methyl Terminated PDMS Polymer | 28.0 | 28.0 | 28.0 |
| Calcium Carbonate (other include silicates, oxides, alumina's and silica's and combinations of) | 65.6 | 59.6 | 63.6 |
| Carbon Black | 1.0 | 1.0 | 1.0 |
| Vinyltrimethoxysilane | 4.0 | 4.0 | 4.0 |
| Aminopropyltriethoxysilane | 1.0 | 1.0 | 1.0 |
| Condensation Catalyst (tin) | 0.4 | 0.4 | 0.4 |
| 0.040 inches Spacer Beads | — | 6.0 | 2.0 |

What is claimed is:

1. A method of assembling an appliance comprising the steps of:
    providing a first substrate and a second substrate, each substrate having interior surfaces for bonding together;
    depositing a curable silicone composition comprising silicone resin and spacer beads on at least one of the interior surfaces of the substrates;
    positioning the interior surfaces in mating arrangement;
    permitting the weight of one of the first or second substrates to compress the curable silicone composition to a desired spacing between the substrates; and
    permitting the curable silicone composition to cure, wherein the spacer beads have an average diameter of between about 0.005" to about 0.05".

2. The method of claim 1 wherein the spacer beads are selected from the group consisting of glass beads, plastic beads, elastomeric beads, hollow beads, solid beads and combinations thereof.

3. A method of assembling an appliance comprising the steps of:
    providing a first substrate and a second substrate, each substrate having interior surfaces for bonding together;
    depositing a curable silicone composition comprising silicone resin and spacer beads on at least one of the interior surfaces of the substrates;
    positioning the interior surfaces in mating arrangement;
    permitting the weight of one of the first or second substrates to compress the curable silicone composition to a desired spacing between the substrates; and
    permitting the curable silicone composition to cure, wherein the spacer beads are present in amounts of about 0.5 to about 10.0% by weight of the silicone composition.

4. The method of claim 1, wherein the depositing step comprises applying a continuous line of silicone composition perimetrically along the interior surface of one or more of the substrates.

5. The method of claim 1, wherein the depositing step comprises applying spots of adhesive discontinuously along the interior surface of one or more of the substrates.

6. The method of claim 1, wherein the silicone composition is a one-part silicone.

7. The method of claim 1, wherein the silicone composition is selected from the group consisting of an oxime-containing silicone resin, alkoxy-containing silicone resins, methacryl-containing silicone resins, vinyl-containing silicone resins and combinations thereof.

8. The method of claim 1, wherein the silicone composition is a room temperature vulcanizing composition.

9. The method of claim 1, wherein the silicone composition is a two-part silicone.

10. The method of claim 1, wherein the silicone composition is a dual cure silicone.

11. The method of claim 1, wherein the silicone composition is a heat cure silicone.

12. The method of claim 1, wherein the first substrate comprises a metal base unit.

13. The method of claim 1, wherein the second substrate comprises a glass substrate.

14. The method of claim l, wherein the first substrate comprises a metal range frame and the second substrate comprises a glass cooktop.

15. The method of claim 3 wherein the spacer beads are selected from the group consisting of glass beads, plastic beads, elastomeric beads, hollow beads, solid beads and combinations thereof.

16. The method of claim 3, wherein the depositing step comprises applying a continuous line of silicone composition perimetrically along the interior surface of one or more of the substrates.

17. The method of claim 3, wherein the depositing step comprises applying spots of adhesive discontinuously along the interior surface of one or more of the substrates.

18. The method of claim 3, wherein the silicone composition is a one-part silicone.

19. The method of claim 3, wherein the silicone composition is selected from the group consisting of an oxime-containing silicone resin, alkoxy-containing silicone resins, methacryl-containing silicone resins, vinyl-containing silicone resins and combinations thereof.

20. The method of claim 3, wherein the silicone composition is a room temperature vulcanizing composition.

21. The method of claim 3, wherein the silicone composition is a two-part silicone.

22. The method of claim 3, wherein the silicone composition is a dual cure silicone.

23. The method of claim 3, wherein the silicone composition is a heat cure silicone.

24. The method of claim 3, wherein the first substrate comprises a metal base unit.

25. The method of claim 3, wherein the second substrate comprises a glass substrate.

26. The method of claim 3, wherein the first substrate comprises a metal range frame and the second substrate comprises a glass cooktop.

* * * * *